(12) United States Patent
Peterson

(10) Patent No.: US 11,156,321 B2
(45) Date of Patent: Oct. 26, 2021

(54) APPARATUS AND METHOD FOR LOADING A PIG INTO A PIPELINE

(71) Applicant: Warren Peterson, Rocky Mountain House (CA)

(72) Inventor: Warren Peterson, Rocky Mountain House (CA)

( * ) Notice: Subject to any disclaimer, the term of this patent is extended or adjusted under 35 U.S.C. 154(b) by 0 days.

(21) Appl. No.: 16/180,620

(22) Filed: Nov. 5, 2018

(65) Prior Publication Data

US 2019/0137029 A1   May 9, 2019

Related U.S. Application Data

(60) Provisional application No. 62/582,085, filed on Nov. 6, 2017.

(51) Int. Cl.
*F16L 55/46* (2006.01)
*F16L 101/50* (2006.01)
*F16L 101/12* (2006.01)

(52) U.S. Cl.
CPC .......... *F16L 55/46* (2013.01); *F16L 2101/12* (2013.01); *F16L 2101/50* (2013.01)

(58) Field of Classification Search
CPC .... F16L 2101/12; F16L 2101/50; F16L 55/46
See application file for complete search history.

(56) References Cited

U.S. PATENT DOCUMENTS

| | | | | |
|---|---|---|---|---|
| 1,006,261 A * | 10/1911 | Mueller | .................. | F16L 55/46 |
| | | | | 15/104.062 |
| 2,028,779 A | 1/1936 | Howe et al. | | |
| 2,575,146 A * | 11/1951 | Thomas | ................ | B08B 9/0554 |
| | | | | 15/104.062 |
| 5,208,937 A * | 5/1993 | Cooper | .................. | B08B 9/055 |
| | | | | 134/8 |
| 5,219,244 A * | 6/1993 | Skeels | ..................... | F16L 55/46 |
| | | | | 15/104.062 |
| 6,925,671 B1 * | 8/2005 | Mouton | ................. | B08B 9/055 |
| | | | | 137/268 |
| 2007/0056609 A1 * | 3/2007 | Schlosser | ............... | B08B 9/055 |
| | | | | 134/22.11 |
| 2016/0348829 A1 * | 12/2016 | Anderson | .............. | F16L 55/46 |
| 2017/0089502 A1 * | 3/2017 | Genta | .................. | B08B 9/0551 |

FOREIGN PATENT DOCUMENTS

| | | | | |
|---|---|---|---|---|
| DE | 19845974 A1 * | 3/2000 | ............. | F16L 55/46 |
| KR | 20130066822 | 6/2013 | | |
| WO | WO-2017052311 A1 * | 3/2017 | ............... | B66D 3/04 |

* cited by examiner

*Primary Examiner* — Marc Carlson
(74) *Attorney, Agent, or Firm* — Bennett Jones LLP

(57) ABSTRACT

An apparatus and related method are provided for loading a pig into a pipeline. The apparatus includes a tubular reducer, a rigid member for attachment to a cable and including a pig-engaging surface, and a guide member slidingly engaged by the rigid member to permit axial movement, while limiting radial movement, of the rigid member in relation to the reducer. In use, when the reducer is aligned concentrically with the pipeline end with the front end of the reducer bearing axially, either directly or indirectly, against the pipeline end, and the pig-engaging surface is disposed axially rearward of the reducer, increased tension in the cable pulls the rigid member axially forward relative to the pipeline, whereupon the attached pig-engaging surface pushes the pig through the reducer and into the pipeline interior.

24 Claims, 7 Drawing Sheets

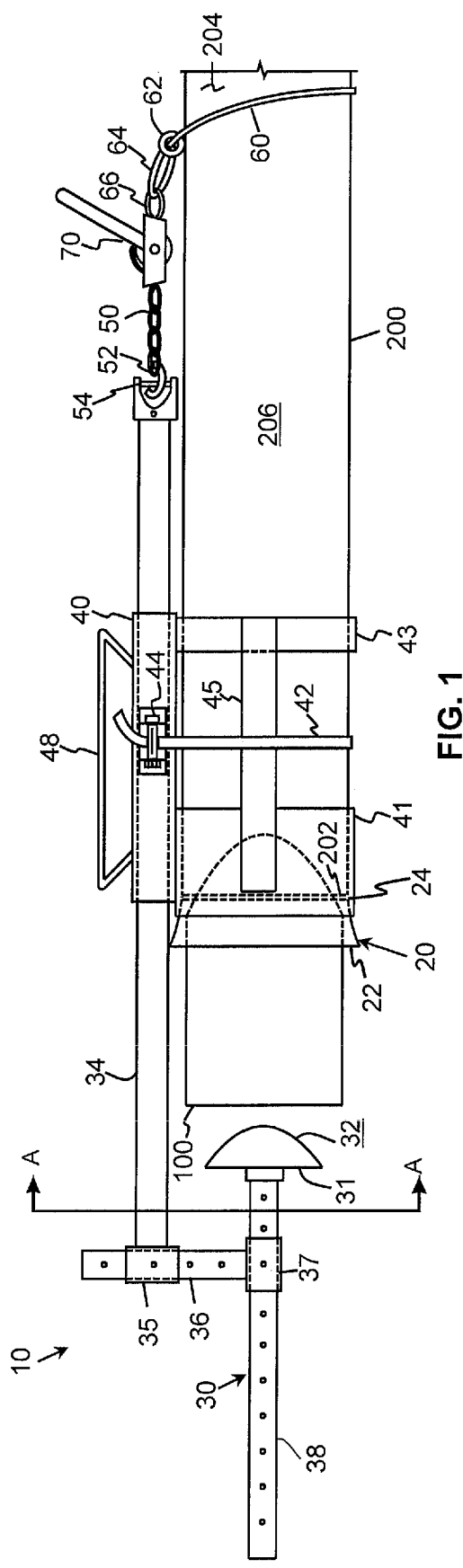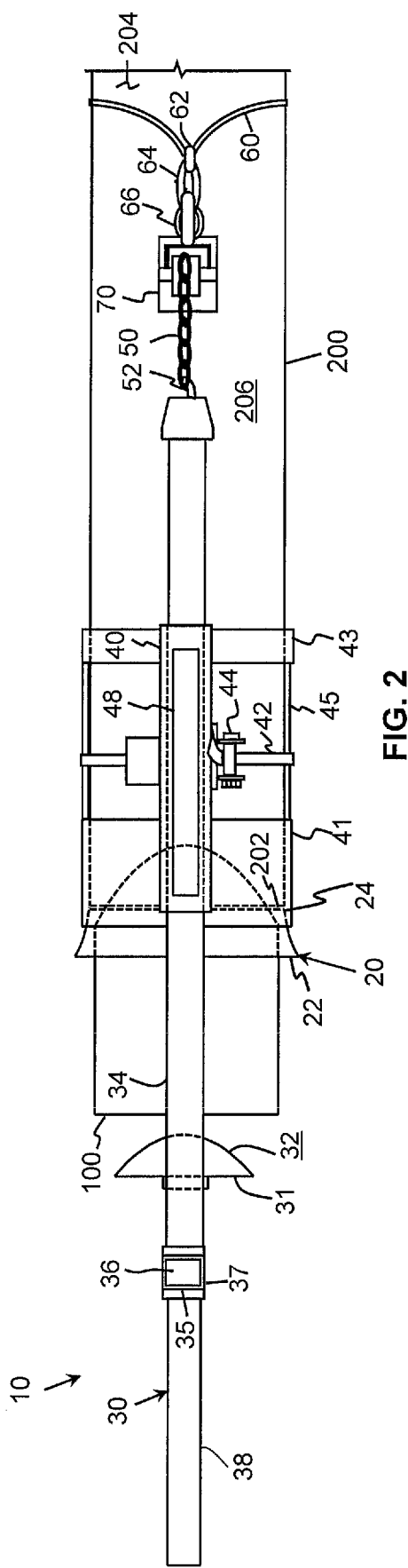

APPARATUS AND METHOD FOR LOADING A PIG INTO A PIPELINE

FIELD OF THE INVENTION

The present invention relates to an apparatus and method for loading a pig into a pipeline.

BACKGROUND OF THE INVENTION

A pig is a device that is inserted into and run through a pipeline to clean or inspect the pipeline. A pig may be made of a resilient foam material such as dense polyurethane, and have an uncompressed outer diameter slightly larger than the inner diameter of the pipeline. When the foam pig is compressed in the axial direction, it tends to expand in the radial direction. The foam pig may be fitted with wear plates made of plastic or metal. Accordingly, considerable frictional forces between the foam pig and the interior of the pipeline may resist loading of the foam pig into the pipeline. A motorized vehicle such as a truck, or a machine such as a hydraulically actuated shovel of an excavator, may be used to force a foam pig into a pipeline, but such practices can be dangerous. The prior art also includes apparatuses for loading cleaning devices into pipelines. U.S. Pat. No. 2,028,779 (Howe et al.) discloses an apparatus in which a winch winds a cable that engages a pulley mounted to an upper end of a piston rod that forces a cleaning or scraping device into a pipeline via a bull plug held in position by a "victalic coupling". U.S. Pat. No. 2,575,146 (Thomas) discloses a pipeline scraper inserter in which a lever and pawl mechanism advances a rack bar relative to a frame that is secured to an annular flange of a pipeline, such that the rack bar pushes the scraper into the pipeline. U.S. Pat. No. 5,208,937 (Cooper) discloses an apparatus in which a conical chamber fits into the end of the pipeline and is held in place by spring tensioned hooks that engage a flange of the pipeline. A cover with a threaded rod is secured to the chamber, and the threaded rod is turned to push the pig through the chamber into the pipeline.

There remains a need for apparatus for loading a pig into a pipeline. It may be desirable for such an apparatus to be compact, portable, adaptable for use with pigs and pipelines of different sizes, and suitable for use with a pipeline without a flanged end opening or other features for attachment of the apparatus.

SUMMARY OF THE INVENTION

In one aspect, the present invention comprises an apparatus for loading a pig into a pipeline defining an axial forward direction from a pipeline end defining a pipeline opening into a pipeline interior, and a radial direction perpendicular to the axial direction. The apparatus comprises: a tubular reducer extending axially from a rear end to a front end configured for concentric alignment with and for bearing axially, either directly or indirectly, against the pipeline end, wherein an inner diameter of the reducer decreases from the rear end to the front end; a pig-engaging surface and an attached rigid member, wherein the rigid member is configured for attachment to a first cable for pulling the rigid member axially forward relative to the reducer when the front end of the reducer bears axially, either directly or indirectly, against the pipeline end, whereupon the pig-engaging surface pushes the pig through the reducer and into the pipeline interior; and a guide member slidingly engaged by the rigid member to permit axial movement, while limiting radial movement, of the rigid member in relation to the reducer.

In one embodiment of the apparatus, the pig-engaging surface is movably attached to the rigid member for selectively adjusting an axial position, or a radial position, or both the axial position and the radial position, of the pig-engaging surface in relation to the reducer.

In one embodiment of the apparatus, in use, the guide member is positioned adjacent to the pipeline in the radial direction when the front end of the reducer bears axially, either directly or indirectly, against the pipeline end. In one embodiment of the apparatus, the guide member comprises a tubular member that slidably receives the rigid member. In one embodiment of the apparatus, the guide member is permanently attached to the reducer, such as by welding.

In one embodiment of the apparatus, the apparatus further comprises a support member that engages an outer wall of the pipeline to support the apparatus on the pipeline. The support member may comprise a tubular sleeve that fits circumferentially around the outer wall of the pipeline, or an arcuate support that extends circumferentially around a portion of the outer wall of the pipeline.

In one embodiment of the apparatus, the apparatus further comprises the first cable, and a first winch for winding the first cable to increase tension in the first cable in the axially forward direction. In one embodiment of the apparatus, the apparatus further comprises a second cable for forming a sling circumferentially around the pipeline, wherein, the first winch is configured for attachment to the second cable such that, when the front end of the reducer bears axially, either directly or indirectly, against the pipeline end, winding the first cable with the first winch tightens the sling around the pipeline to transmit tension in the first cable to the pipeline.

In one embodiment of the apparatus, the apparatus further comprises a flexible band or a third cable attached to the guide member and for constricting circumferentially around at least a portion of the pipeline to restrain movement of the guide member in relation to the pipeline.

In one embodiment of the apparatus, the apparatus further comprises a second guide member that engages the rigid member to permit axial movement, while limiting radial movement of the rigid member in relation to the reducer, wherein, when the front end of the reducer bears axially, either directly or indirectly, against the pipeline end, the first guide member and the second guide member are disposed at different radial positions in relation to the pipeline.

In one embodiment of the apparatus, the apparatus further comprises a tubular reducer extension separable from the reducer, wherein the reducer extension extends axially from a rear end to a front end, wherein a rear end of the reducer extension is configured for concentric alignment with and for bearing axially, either directly or indirectly, against the front end of the reducer, wherein the front end of the reducer extension is configured for concentric alignment with and for bearing axially, either directly or indirectly, against the pipeline end, wherein an inner diameter of the reducer decreases from the rear end of the reducer extension to the front end of the reducer extension, wherein an inner diameter of the tubular reducer extension at the rear end of the reducer extension is substantially the same as the inner diameter of the reducer at the front end of the reducer.

In another aspect, the present invention comprises a method for loading a pig into a pipeline defining an axial forward direction from a pipeline end defining a pipeline opening into a pipeline interior, and a radial direction perpendicular to the axial direction. The method comprises the steps of:

(a) providing an apparatus comprising:
   (i) a tubular reducer extending axially from a rear end to a front end, wherein an inner diameter of the reducer decreases from the rear end to the front end;
   (ii) a rigid member attached to a first cable; and
   (iii) a pig-engaging surface attached to the rigid member;
(b) aligning the reducer concentrically with the pipeline end, with the front end of the reducer bearing axially, either directly or indirectly, against the pipeline end;
(c) positioning the rigid member such that the pig-engaging surface is disposed axially rearward of the reducer, with the pig disposed axially between the pig-engaging surface and the reducer; and
(d) increasing tension in the first cable to pull the rigid member axially forward relative to the reducer while the front end of the reducer bears axially, either directly or indirectly, against the pipeline end, whereupon the pig-engaging surface pushes the pig through the reducer and into the pipeline interior.

In one embodiment of the method, the pig-engaging surface is movably attached to the rigid member for selectively adjusting an axial position or a radial position, or both the axial position and the radial position, of the pig-engaging surface in relation to the reducer.

In one embodiment of the method, the apparatus further comprises a support member that engages an outer wall of the pipeline to support the apparatus on the pipeline.

In one embodiment of the method, the apparatus further comprises a guide member slidingly engaged by the rigid member to permit axial movement, while limiting radial movement, of the rigid member in relation to the reducer, wherein, when the front end of the reducer bears axially, either directly or indirectly, against the pipeline end, the guide member is positioned adjacent to the pipeline in the radial direction.

In one embodiment of the method, the apparatus further comprises a flexible band or a cable that is attached to the guide member and constricts circumferentially around at least a portion of the pipeline to restrain movement of the guide member in relation to the pipeline.

In embodiments of the method, the apparatus may include any feature or combination of the features of the apparatus as described above.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. Throughout the drawings, dashed lines show parts that are hidden from view.

FIG. 1 shows a side view of an embodiment of an apparatus of the present invention for loading a pig into a pipeline, when mounted on a pipeline.

FIG. 2 shows a top view of the apparatus of FIG. 1.

DETAILED DESCRIPTION OF THE INVENTION

Definitions. Any term or expression not expressly defined herein shall have its commonly accepted definition understood by a person skilled in the art.

As used herein, "attached" in describing the relationship between two parts includes the case where the two parts are directly attached to each other without an intervening part, and the case where the two parts are indirectly attached to each other with one or more intervening parts in between them.

As used herein, "cable" refers to any elongate member that can transmit a tensile force between its ends, and is sufficiently flexible to be wound around a curved object (such as a drum of a winch, or a radial section of a pipeline), irrespective of the constituent material of the cable. Non-limiting examples of cables include members commonly referred to as ropes, wire ropes, chains, straps, and belts.

As used herein, "winch" refers to any device that may be used to wind up and wind out a cable. In embodiments, a winch may be operated either manually, or using a powered mechanical device including, without limitation, an electrically-powered motor, or a gasoline-powered engine.

Figure 3:
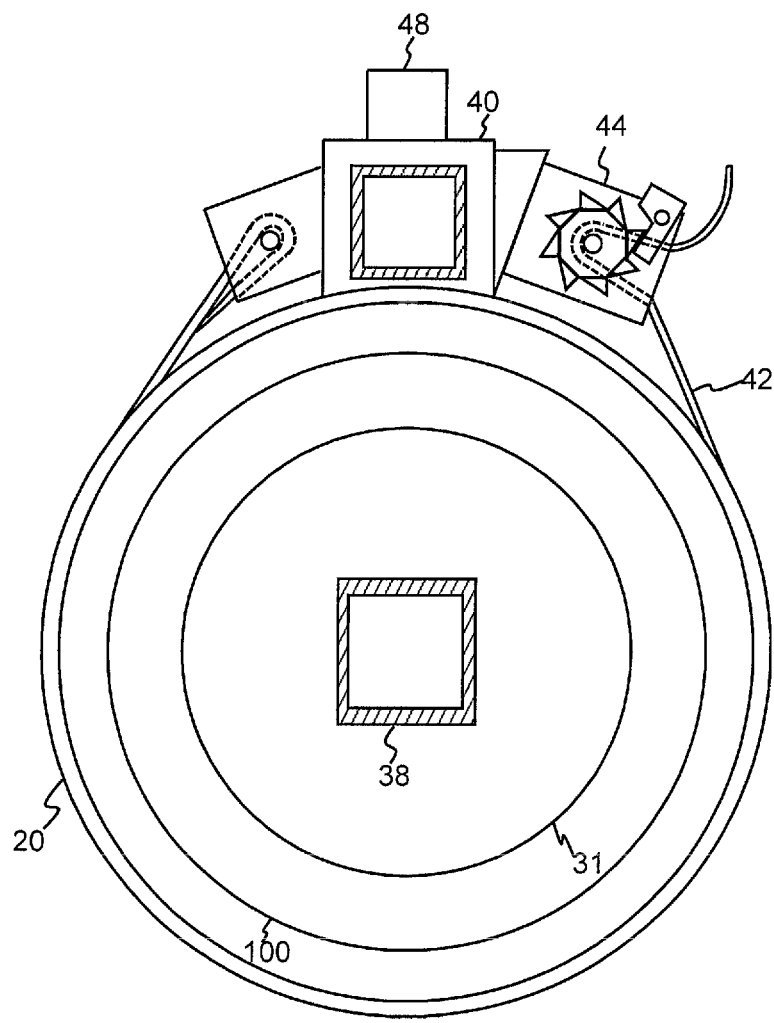
FIG. 3 shows a sectional view of the apparatus of FIG. 1, along line A-A of FIG. 1.

Overview. FIGS. 1 and 2 show a side view and a top view, respectively, of an embodiment of an apparatus (10) of the present invention for loading a pig (100) into a pipeline (200), when mounted on the pipeline (200). FIG. 3 shows a cross-sectional view of the apparatus (10) along section line A-A of FIG. 1.

Referring to FIG. 1, the pipeline (200) defines an axial forward direction from a pipeline end (202) defining a pipeline opening into a pipeline interior (204), and a radial direction perpendicular to the axial direction. In FIG. 1, the axial forward direction corresponds to the direction from left to right in the drawing plane, and the radial direction includes the direction from bottom to top in the drawing plane, and the direction perpendicular to the drawing plane. In the embodiment shown in FIG. 1, the pipeline (200) has an outer diameter of approximately 12 inches (30 cm), and the pig (100) is made of foam and bullet-shaped. The present invention is not limited by the size of the pipeline (200), or the material or shape of the pig (100).

In the embodiment shown in FIG. 1, the apparatus (10) includes a tubular reducer (20), a rigid member (30), a guide member (40), a tensioning mechanism that includes a first cable (50), a second cable (60), and a winch (70), and other components, as described in greater detail below. These parts of the apparatus (10) may be made of any suitably strong and rigid material, with non-limiting examples including metals such as steel or aluminum, plastic, or a composite material.

Tubular reducer. The tubular reducer (20) facilitates insertion of the pig (100) into pipeline end (202). The tubular reducer (20) also bears, directly or indirectly, against the pipeline end (202) to transmit axial force to the pipeline end (202), when the apparatus (10) is used to load the pig (100) into the pipeline. The reducer (20) extends axially from a rear end (22) to a front end (24). The reducer (20) has an inner diameter that is sized to permit passage of the pig (100), and decreases from the rear end (22) to the front end (24). The reducer (20) is sized such that the front end (24) can be concentrically aligned with the pipeline end (202), so that the reducer (20) and pipeline opening collectively form a passage for the pig (100), with the front end (24) bearing axially, directly or indirectly, against the pipeline end (202). In the embodiment shown in FIG. 1, the inner wall of the reducer (20) is substantially bell-shaped or conical-shaped, such that the inner diameter of the reducer (20) gradually tapers from the rear end (22) to the front end (24), so as to gradually compress the foam pig (100) in the radial direction as it moves axially forward through the reducer (20). In this embodiment, the reducer (20) is made of steel. In the embodiment shown in FIG. 1, the front end (24) of the reducer (20) has an annular surface in a radial plane that bears directly against the annular surface of the pipeline end (202).

Rigid member and pig-engaging surface. The rigid member (30) is attached to a pig-engaging surface (32). The rigid member (30) transmits a tensile force from the first cable (50) to the pig-engaging surface (32), such that the pig-engaging surface (32) pushes the pig (100) through the passage defined by the reducer (20) and the pipeline opening into the pipeline interior (204).

In the embodiment shown in FIG. 1, the rigid member (30) is collectively formed by a pull rod (34), an intermediate rod (36), and a plunger rod (38). In this embodiment, a circular steel plate (31) that is fixedly attached to the front end of the plunger rod (38), such as by fasteners such as bolts, or by welding. The axially forward facing surface of the plate (31) forms the pig-engaging surface (32). In this embodiment, the pig-engaging surface (32) is convexly-shaped, so as to be complementary in shape to the concavely-shaped rear end of the pig (100). The complementary shape of the pig-engaging surface (32) and the rear end of the pig (100) may help radially centralize the pig-engaging surface (32) in respect to the pig (100). For the same purpose, the pig-engaging surface (32) may define an aperture at its center that receives a bolt or other protuberance extending axially from the rear end of the pig (100), as may be found on some pigs (not shown). In other embodiments, the pig-engaging surface (32) may be flat or have different contours. In this embodiment, the plate (31) is secured with bolts so that it may be detached from the plunger rod (38) and re-attached in a reverse orientation so that a concavely-shaped side of the plate (31) is positioned opposite to the tapered end of the bullet-shaped pig (100) in a reverse orientation with its tapered end pointing away from the pipe line end (202) in the axial rearward direction. When the plate (31) is in this reverse orientation, the apparatus (10) may be used to load the pig (100) in the reverse orientation. The plate (31) is preferably sufficiently large so as to distribute a compressive force fairly evenly across the radial cross-section of the pig (100). In this embodiment, each of the pull rod (34), intermediate rod (36), and plunger rod (38) is made of a steel tubular member having a hollow square cross-section measuring approximately 2½ inches per side. In other embodiments, the tubular members may have smaller or larger dimensions depending on factors such as the size of the pig (100), the anticipated amount of friction that has to be overcome to load the pig (100) into the pipeline (200), and the material properties of the member. In other embodiments (not shown), the rigid member (30) and the constituent pig-engaging surface (32) may be formed as a single monolithic part.

In embodiments, the axial and radial position of the pig-engaging surface (32) relative to the pipeline end (202) may be adjustable, when the apparatus (10) is mounted on the pipeline end (202). The axial adjustability accommodates pigs (100) of different axial lengths, while the radial adjustability accommodate pigs (100) and pipelines (200) of different diameters. In general, the axial and radially adjustability may be implemented by forming the rigid member (30) from a first portion, and a second portion that is attached to the pig-engaging surface (32) and is movably attached to the first portion.

For example, in the embodiment shown in FIG. 1, the radial adjustability is achieved by a radially-extending collar (35) welded to the rear end of the pull rod (34). In this embodiment, the radially-extending collar (35) is a steel tubular member having a hollow square cross-section with an inner dimension slightly larger than the outer dimension of the intermediate rod (36). By radial sliding of the intermediate rod (36) within the radially-extending collar (35), one of several radially spaced apart apertures defined by the intermediate rod (36) can be selectively aligned with an aperture defined by the radially-extending collar (35). A pin-like fastener (e.g., a bolt, or dowel) can be passed through the aligned apertures to secure the radial position of intermediate rod (36) relative to the pull rod (34), and hence fix the radial position of the pig-engaging surface (32), relative to the pipeline end (202). Similarly, the axial adjustability is achieved by an axially-extending collar (37) welded to the bottom end of the intermediate rod (36). In this embodiment, the axially-extending collar (37) is a steel tubular member having a hollow square cross-section with an inner dimension slightly larger than the outer dimension of the plunger rod (38). By axial sliding of the plunger rod (38) within the axially-extending collar (37), one of several axially spaced-apart apertures defined by the plunger rod (38) can be selectively aligned with an aperture defined by the axially-extending collar (37). A pin-like fastener (e.g., a bolt, or dowel) can be passed through the aligned apertures to secure the axial position of plunger rod (38) relative to the intermediate rod (36), and hence fix the axial position of the pig-engaging surface (32), relative to the pipeline end (202), for a given position of the pull rod (34).

Guide member. The guide member (40) constrains movement of the pig-engaging surface (32) relative to the pipeline opening in the axial direction when the apparatus (10) is mounted on the pipeline (200). In the embodiment of the apparatus (10) shown in FIGS. 1 to 3, the guide member (40) is made of an axially-extending steel tubular member having a hollow square cross-section with an inner dimension slightly larger than the outer dimension of the pull rod (34), so as to receive and permit axial sliding of the pull rod (34) therein, while substantially preventing radial movement of the pull rod (34) therein. In the embodiment shown in FIGS. 1 to 3, an inverted U-shaped handle (48) is attached to the upper surface of the guide member (40). The handle (48) may be used when positioning the subassembly on the pipeline (200).

Support member. The apparatus (10) may include one or more support members for supporting the apparatus (10) by engaging an outer wall (206) of pipeline (200) to facilitate positioning the front end (24) of the reducer (20) into concentric alignment, and direct or indirect axially bearing relationship, with the pipeline end (202). In the embodiment shown in FIGS. 1 to 3, for example, the support members include a rear tubular sleeve (41) and a front tubular sleeve (43) attached by an axially extending member (45). In other embodiments, the support member may have an arcuate form that extends circumferentially only partially around the pipeline (200). In this embodiment, the rear tubular sleeve (41) and the front tubular sleeve (43) have an inner diameter slightly larger than the outer diameter of the pipeline (200), so that they can slide loosely over the pipeline end (202), until the front end (24) of the tubular reducer (20) abuts the pipeline end (202). In this embodiment, the inner surface of the rear portion of the rear tubular sleeve (41) is welded to the outer surface of the tubular reducer (20). The outer surface of the rear tubular sleeve (41) and the outer surface of the front tubular sleeve (43) are welded to the guide member (40). As such, the reducer (20) is permanently attached to the guide member (40) via the tubular sleeve (41).

Fastening mechanism for guide member. A releasable fastening mechanism may be provided to secure the guide member (40) to the pipeline end (202) before inducing tension in the first cable (50). In the embodiment shown in FIGS. 1 to 3, for example, the releasable fastening mechanism includes a cable in the form of a nylon strap (42) and a manually operable ratcheting winch (44) (not to be confused with winch (70)), that tightens the strap (42) circumferentially around the pipeline (200). As shown in FIG. 3, one end of the strap (42) forms a loop around an axially extending pin attached to the left side of the guide member (40). The strap (42) wraps circumferentially around the pipeline (200). The free end of the strap (42) passes through the ratcheting winch (44). The ratcheting winch (44) is used to tighten the strap (42) circumferentially around the pipeline (200), and thereby resist movement of the guide member (40) relative to the pipeline (200).

Tensioning mechanism. The tensioning mechanism includes the first cable (50) and the winch (70). In use, the first cable (50) is attached to the rigid member (30) and the pipeline (200) such that winding the first cable (50) with the winch (70) induces tension in the tensioning mechanism between the rigid member (30) and the pipeline (200). The tensioning mechanism may be attached to the rigid member (30) and the pipeline (200) in any suitable manner to achieve this effect. In the embodiment shown in FIG. 1, the tensioning mechanism also includes a second cable (60) that is used to attach the tensioning mechanism to the pipeline (200), in the manner described below.

First cable. In the embodiment shown in FIG. 1, the first cable (50) is attached to a portion of the rigid member (30) so that tension induced in the first cable (50) pulls the pig-engaging surface (32) in the axially forward direction toward the pipeline end (202). A portion of the rigid member (30) may be configured for attachment to the first cable (50) in any suitable manner so that the first cable (50) can transmit tensile force to the rigid member (30). As a non-limiting example, in the embodiment shown in FIG. 1, the first cable (50) is in the form of a steel chain made of numerous connected links. The rear end of the first cable (50) is attached to the rigid member (30) via a loading pin (54) attached to the front end of the pull rod (34). In the orientation of the apparatus (10) shown in FIG. 1, the loading pin (34) is preferably aligned with the vertical radial direction of the pipeline (200) so that the force imparted by the hook (52) is substantially aligned with the axial direction. It may be desirable to minimize the radial component of the force on the pull rod (34), as it tends to bend the pull rod (34) downward and increase friction between the pull rod (34) and the inner wall of the guide member (40), both of which may interfere with the pull rod (34) sliding freely within the guide member (40). In other embodiments, the rigid member (30) may be configured for attachment to the first cable (50) by defining an aperture for securing the first cable (50), or by including an attached fastener such as a shackle, a hook, a clamp, a clip, a hitch, or an anchor, for securing the first cable (50).

Second cable. In the embodiment shown in FIG. 1, the second cable (60) is used to form a sling that loops circumferentially around the pipeline (200). A portion of the winch (70) may be configured for attachment to the second cable (60) in any suitable manner so that tension in the first cable (50) is transmitted via the winch (70) to the second cable (60) so that the sling tightens around (i.e., chokes) the pipeline (200) to restrain the winch (70) against movement relative to the pipeline (200). As a non-limiting example, in the embodiment shown in FIG. 1, the second cable (60) is in the form of a 2-inch wide nylon strap that wraps around the pipeline (200) to form a sling. A first end of the second cable (60) is attached to an eyelet (62). The opposite second end of the second cable (60) is threaded through the eyelet (62), and forms an end loop (64) that engages a shackle (66) attached to the front end of the winch (70). In other embodiments, the winch (70) configured for attachment to the second cable (60) by defining an aperture for securing the second cable (60), or by including an attached fastener such as a hook, a clamp, a clip, a hitch, or an anchor for securing the second cable (60).

Winch. In the embodiment shown in FIG. 1, the winch (70) is attached to the first cable (50) and the second cable (60) as described above. Further, the winch (70) winds the first cable (50). In the embodiment shown in FIG. 1, the winch (70) is a manually operable ratcheting come-a-long winch (70) (also known as a come-a-long cable puller) that is used to wind the first cable (50). As known in the art, a typical ratcheting come-along winch (70) includes a drum for winding the cable. The drum is associated with a toothed-wheel rotatably mounted on a frame. A lever with an attached pawl is pivotally attached to the frame. Pivoting of the lever relative to the frame in one direction causes the pawl to catch the toothed-wheel, thereby rotating the drum in one direction, while preventing rotation of the drum in the opposite direction. A second end of the second cable (60) is attached to the winch (70) via the end loop (64) and shackle (66) as described above.

Use and operation. In order to use the embodiment of the apparatus (10) shown in FIGS. 1 to 3, the apparatus (10) is mounted on the pipeline (200). The sling formed by the second cable (60) is looped around the pipeline (200), and the tubular sleeves (41, 43) are slid over the pipeline end (202) such that the reducer (20) is concentric with the pipeline end (202). The apparatus (10) is advanced axially forward relative to the pipeline (200) until the front end (24) of the reducer (20) abuts and bears axially against the pipeline end (202). In the embodiment of FIGS. 1 to 3, the apparatus (10) is secured to the pipeline (200) using the manually operable ratcheting winch (44) to tighten the strap

(42) around the pipeline (200). The front end of the pig (100) is manually inserted into the rear end (22) of the reducer (20), and temporarily held therein by friction between the pig (100) and the inner surface of the reducer (20).

If necessary, the radial position of the pig-engaging surface (32) is adjusted so that the circular pig-engaging surface (32) is concentric with the pig (100). This can be achieved by sliding the intermediate rod (36) within the radially-extending collar (35) to selectively align one of the apertures of the intermediate rod (36) with an aperture defined by the radially-extending collar (35), and inserting a pin through the aligned apertures. If necessary, the axial position of the pig-engaging surface (32) is adjusted so that the pig-engaging surface (32) contacts the rear end of the pig (100). This can be achieved by sliding the plunger rod (38) within the axially-extending collar (37) to selectively align one of the apertures defined by the plunger rod (38) with an aperture defined by the axially-extending collar (37), and inserting a pin through the aligned apertures.

The lever of the winch (70) is repeatedly advanced to wind the first cable (50). Initially, the friction between the pig (100) and the reducer (20) that resists axially forward movement of the pull rod (34) may exceed the friction between the second cable (60) and the pipeline (200) that resists axially rearward movement of the winch (70). If so, winding of the first cable (50) is initially accompanied by axially rearward movement (in FIG. 1, to the left) of the winch (70). As the winch (70) pulls rearwards on the end loop (64) of the second cable (60), the second cable (60) advances through the eyelet (62), causing the sling formed by the second cable (60) to tighten around the pipeline (200). Eventually, the sling constricts the pipeline (200) with sufficient force that friction between the second cable (60) and the pipeline (200) resists further axially rearward movement of the winch (70). At that point, continued winding of the first cable (50) is accompanied by axially forward movement (in FIG. 1, to the right) of the pull rod (34) and the attached pig-engaging surface (32). The pig-engaging surface (32) thereby pushes the pig (100) axially forward through the reducer (20) and the pipeline end (202), thus loading the pig (100) into the pipeline (200). The apparatus (10) may then be dismounted from the pipeline (200) by reversing the foregoing steps for loading the pig (100) and mounting the apparatus (10) on the pipeline (200).

Figure 4:
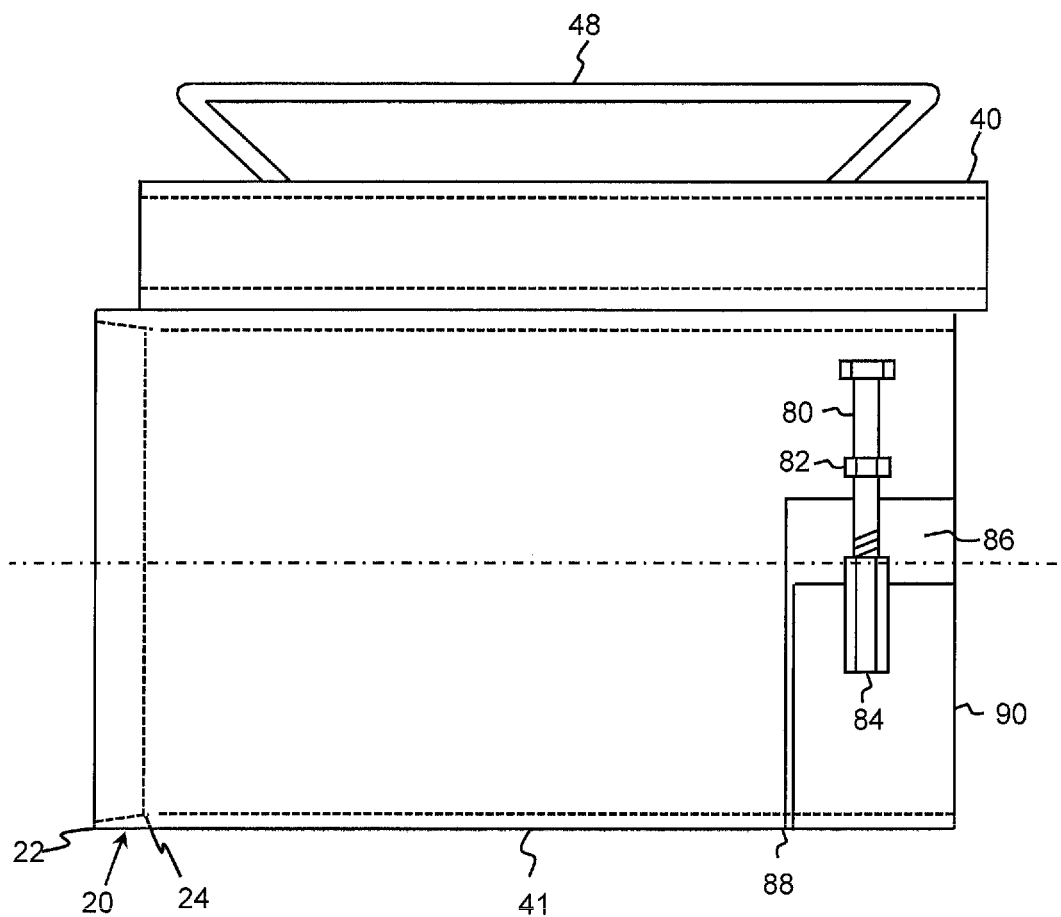
FIG. 4 shows a side view of another embodiment of a subassembly of a reducer, a tubular sleeve and guide member of an apparatus of the present invention for loading a pig into a pipeline.

Embodiment with alternative fastening mechanism. FIG. 4 shows a side view of another embodiment of a subassembly of the embodiment of an apparatus (10) of the present invention, including a reducer (20), guide member (40), a tubular sleeve (41), a threaded bolt (80), a first retainer (82), and a second retainer (84). The subassembly shown in FIG. 4 may be adapted in a like manner for use with the remainder of the apparatus (10) of FIGS. 1 to 3. The embodiment of the subassembly shown in FIG. 4 is similar to that shown in FIGS. 1 to 3, with some differences as follows. First, the reducer (20) is disposed entirely within the tubular sleeve (41) and formed monolithically with the tubular sleeve (41). Second, the tubular sleeve (41) extends axially for substantially the entire length of the guide member (40). There is no rear tubular sleeve (43). Third, in use, the guide member (40) is releasably secured to the pipeline (200) by the clamping effect of the tubular sleeve (41), the threaded bolt (80), and the retainers (82, 84). A front portion of the tubular sleeve (41) is removed to define a gap (86). A cut (88) in the tubular sleeve (41) extends circumferentially around part of the tubular sleeve (41), so as to create a flexible band (90) integrally attached to the tubular sleeve (41) having a first end circumferentially on one side of the gap (86), and a second end circumferentially on the opposite site of the gap (86). The first retainer (82) is attached to first end of the band (90) on one side of the gap (86), while the second threaded retainer (84) is attached to the second end of the band (90) on the opposite side of the gap (86). In the embodiment shown, each of the retainers (82, 84) is formed by a threaded nut welded to the tubular sleeve (41), and as such both retainers (82, 84) are threaded. In other embodiments, only the second retainer (84) may be threaded, and the retainers may be formed by different types of parts. The tubular sleeve (41) is dimensioned to slide loosely over the pipeline end (202). Once properly positioned, the bolt (80) is inserted through the first retainer (82) and into the second threaded retainer (84). In the embodiment shown in FIG. 4, the bolt (80) has a head wider than its shaft, which comes into bearing engagement with the first retainer (82) as the bolt (80) is rotated therein. The bearing engagement of the bolt head with the first retainer (82), and the cooperation between the threaded bolt (80) and the threaded aperture of the second retainer (84) when the bolt (80) is rotated, causes the retainers (82, 84) to be drawn toward each other, such that the attached band (90) constricts around the pipeline (200). The geometric and material properties of the band (90) may be selected so that it is sufficiently flexible and does not unduly resist the retainers (82, 84) being drawn together. Friction between the inner surface of the band (90) and the outer surface of the pipeline (200) resists movement of the attached tubular sleeve (41) and guide member (40) relative to the pipeline (200).

Embodiment with multiple guide members. In embodiments, the apparatus (10) may have a plurality of guide members (i.e., any number more than one guide member). An apparatus (10) having multiple guide members may help to ensure that the rigid member (30) applies forces to the pig (100) in a direction that is parallel to the axial direction. This may be particularly important when the apparatus (10) is used with pigs (100) of larger diameter, as such pigs (100) may require higher loading forces on account of greater frictional forces arising from their greater surface area, and may deform more readily in such manner that increases frictional forces between the pig (100) and the interior wall of the pipeline (200), if subjected to eccentric loading by the rigid member (30).

Figure 5:
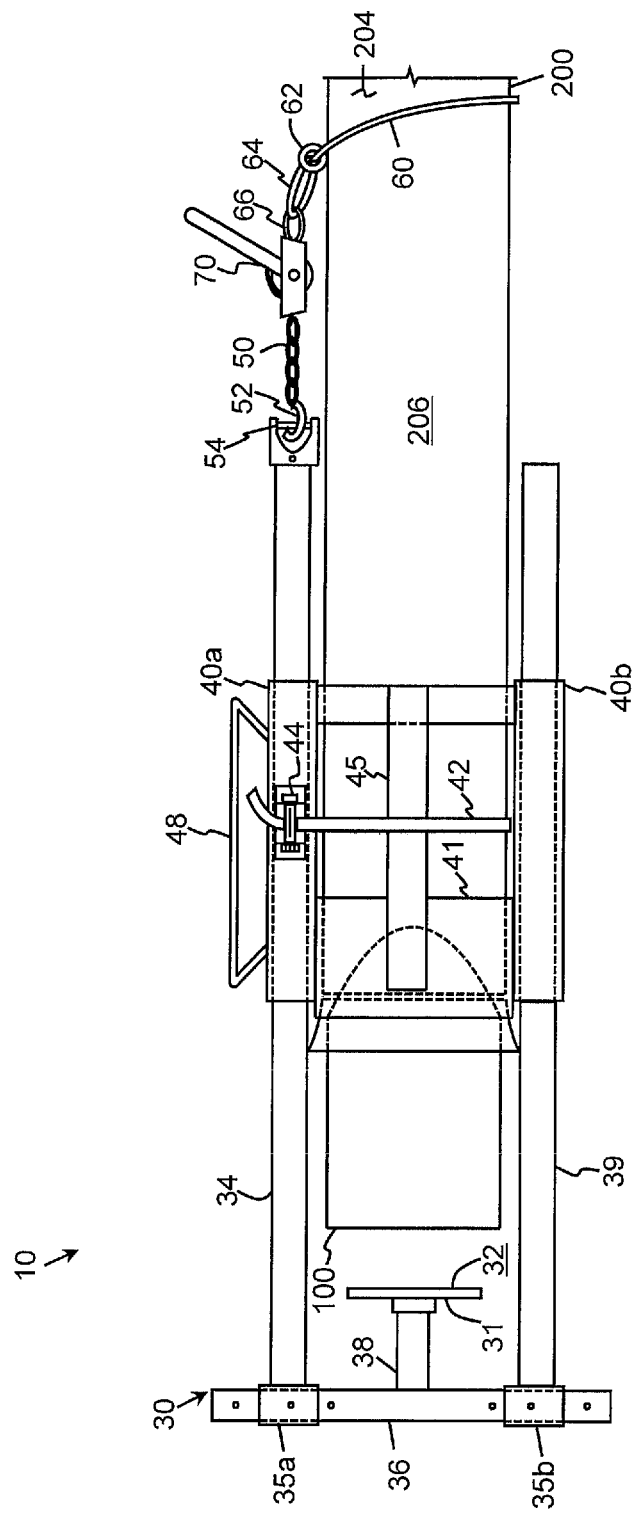
FIG. 5 shows a side view of another embodiment of an apparatus of the present invention for loading a pig into a pipeline, when mounted on a pipeline.

For example, FIG. 5 shows a side view of another embodiment of an apparatus (10) when mounted on a pipeline (200). The embodiment of the apparatus (10) in FIG. 5 is similar to the embodiment of the apparatus (10) shown in FIG. 1, but has two tubular guide members (40a, 40b) attached to the tubular sleeve (41). In particular, the guide members (40a, 40b) are welded to the outside surface of the tubular sleeve (41) at positions on the tubular sleeve (41) that are about 180 degrees apart from each other. In other embodiments with a greater number of guide members (40), the guide members (40) may be radially spaced apart from each other with approximately equal angular separation between them.

In the embodiment shown in FIG. 5, the rigid member (30) has a circular plate (31) attached to the front end of the plunger rod (38). The rigid member (30) is adapted for use with the two guide members (40a, 40b) by having an additional axially extending rod (39) which is received in the second guide member (40b), while the pull rod (34) is received in the first guide member (40a). In this embodiment, the intermediate rod (36) is slidably received within a first radially-extending collar (35a) attached to the pull rod (34), and slidably received within a second radially-extending collar (35b) attached to the axially extending rod (39). In this embodiment, the radial position of the pig-engaging surface (32) is selectively adjustable by sliding of the intermediate rod (36) within the radially-extending collars (35a, 35b), and the insertion of pins through aligned apertures of these parts, in a manner analogous to that described above in respect to FIG. 1. In other embodiments, the axial position of the pig-engaging surface (32) relative to the intermediate rod (36) may also be axially adjustable by use of an axially extending collar in a manner analogous to the axially extending collar (37) in the embodiment of the apparatus shown in FIG. 1.

In FIG. 5, the embodiment of the apparatus (10) is shown as having a single tensioning mechanism (formed by first cable (50), second cable (60), and winch (70), collectively as described below) that is attached to the pull rod (34), but not the axially extending rod (39). In other embodiments (not shown), axially extending rod (39) may be used as a second pull rod. For example, in one embodiment (not shown), the single tensioning mechanism may also be attached to the axially extending rod (39), such that the single tensioning mechanism is used to simultaneously pull on both the pull rod (34) and the axially extending rod (39). In another embodiment (not shown), the apparatus (10) may have a second tensioning mechanism (e.g., formed by a third cable, fourth cable and a second winch, collectively, having a relationship analogous to that of the first cable (50), second cable (60), and winch (70)), that is attached to the axially extending rod (39). The first and second tensioning mechanisms may be used to pull on the pull rod (34) and the axially extending rod (39), respectively, independently of each other. In this manner, the rigid member (30) can be subjected to the pulling forces exerted by two tensioning mechanisms.

Embodiment with removable reducer extension. Pipelines used in the oil and gas industry are typically provided in standardized sizes specified by "nominal pipe sizes" determined by the outer diameter of the pipe. Each nominal pipe size is typically available in a variety of "schedules" determined by the wall thickness of the pipe. For example, pipelines having a standard outer diameter of about 12.75 inches (323.85 mm) may be available in about a dozen different standard wall thicknesses ranging from about 0.156 inches (3.962 mm) to about 1.312 inches (33.325 mm).

In some embodiments, the apparatus (10) is adapted for use with multiple pipelines having the same outer diameter but different wall thicknesses by providing one or more removable reducer extensions that permit a smooth transition of the inner surface of the reducer (20) to the inner surface of the pipeline (200). As a non-limiting example, FIGS. 6A to 6F show different subassemblies of the reducer (20), the tubular sleeve (41), and tubular reducer extensions (90a, 90b) so that the apparatus (10) can be used with different pipelines (200a, 200b, 200c) having different wall thicknesses. It will be appreciated that the subassemblies may be adapted for use with the remainder of the apparatus (10) such as shown in the embodiment of FIG. 1, which is omitted for from the views for simplicity. As a non-limiting example, the three pipelines (200a, 200a, 200b) have a standard outer diameter ($D_{p,o}$) of about 12.75 inches (323.85 mm). However, the three pipelines (200a, 200b, 200c) have wall thicknesses of 0.156 inches (3.962 mm), 0.687 inches (17.450 mm), and 1.312 inches (33.325 mm), respectively, such that they have inner diameters $D_{p,ia}$, $D_{p,ib}$, and $D_{p,ic}$, respectively, of about 12.438 inches (315.926 mm), 11.376 inches (288.950 mm), and 10.126 inches (257.200 mm), respectively.

Figure 6A:
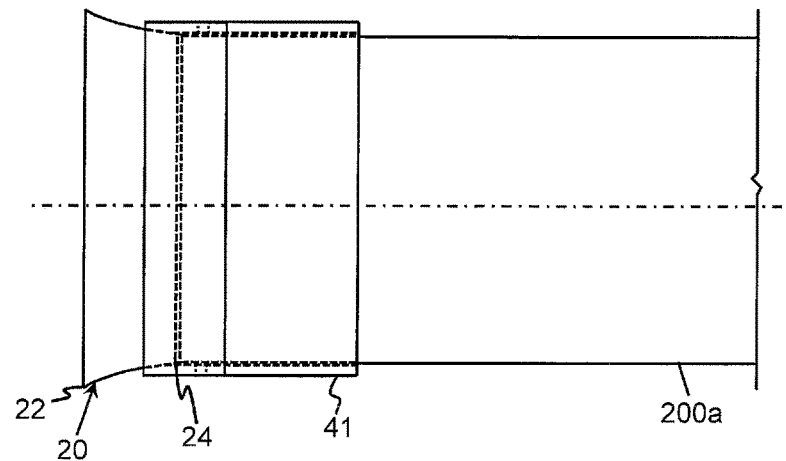
FIGS. 6A and 6B show an assembled side view and an exploded side view, respectively, of an embodiment of a subassembly of a reducer and a tubular sleeve for an apparatus of the present invention, in relation to a first pipeline.
Figure 6B:
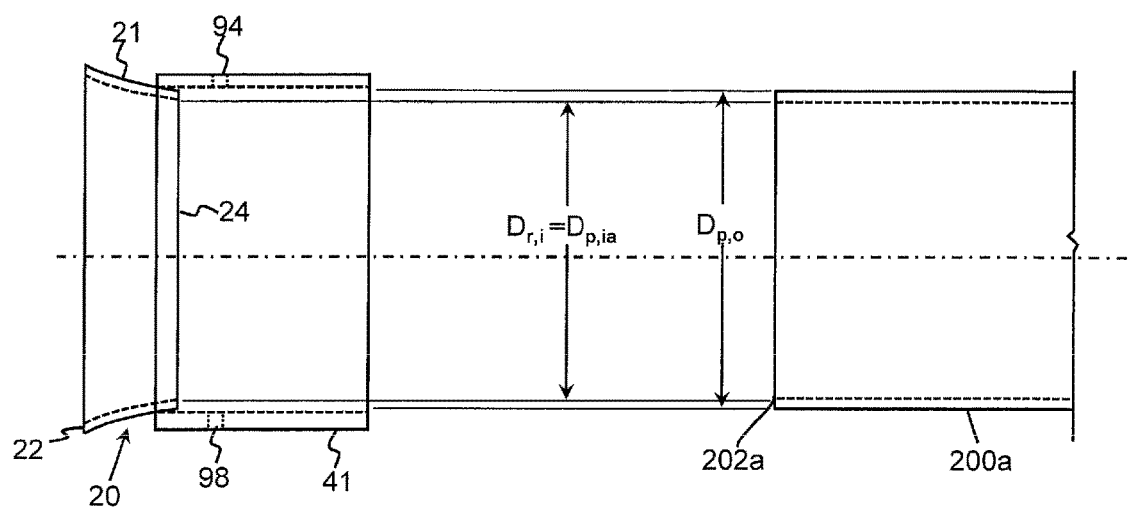

FIGS. 6A and 6B show the assembled view and the exploded view, respectively, of the subassembly, without either tubular reducer extension (90a, 90b), for use with the first pipeline (200a). In this embodiment, at its front end (24), the outer diameter of the reducer (20) is about 12.75 inches (323.85 mm)—i.e., about the same as the outer diameter, $D_{p,o}$, of the pipeline (200a). At its front end (24), the inner diameter of the reducer (20), $D_{r,i}$, is about 12.438 inches (315.926 mm)—i.e., about the same as the inner diameter, $D_{p,ia}$, of the first pipeline (200a). Accordingly, when the end of the pipeline (200a) abuts against the front end (24) of the reducer (20) (as shown in FIG. 6A), their inner walls create a smooth passage for the pig (100) without any appreciable surface irregularity that would impede movement of the pig (100). When the reducer (20) is used in this manner, the front end (24) of the reducer (20) bears axially, directly, against the pipeline end (202a).

Figure 6C:
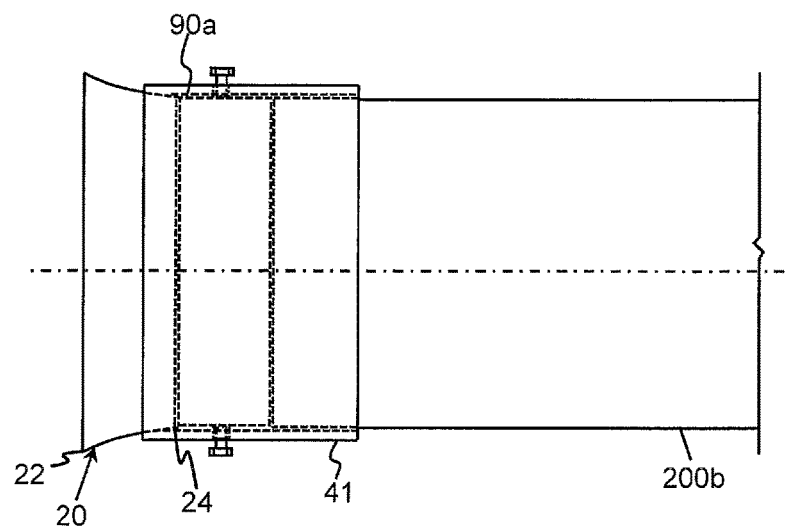
FIGS. 6C and 6D show an assembled view and an exploded view, respectively, of the subassembly of FIGS. 6A and 6B, with a first tubular reducer extension, in relation to a second pipeline having an inner diameter less than the inner diameter of the first pipeline in FIGS. 6A and 6B.
Figure 6D:
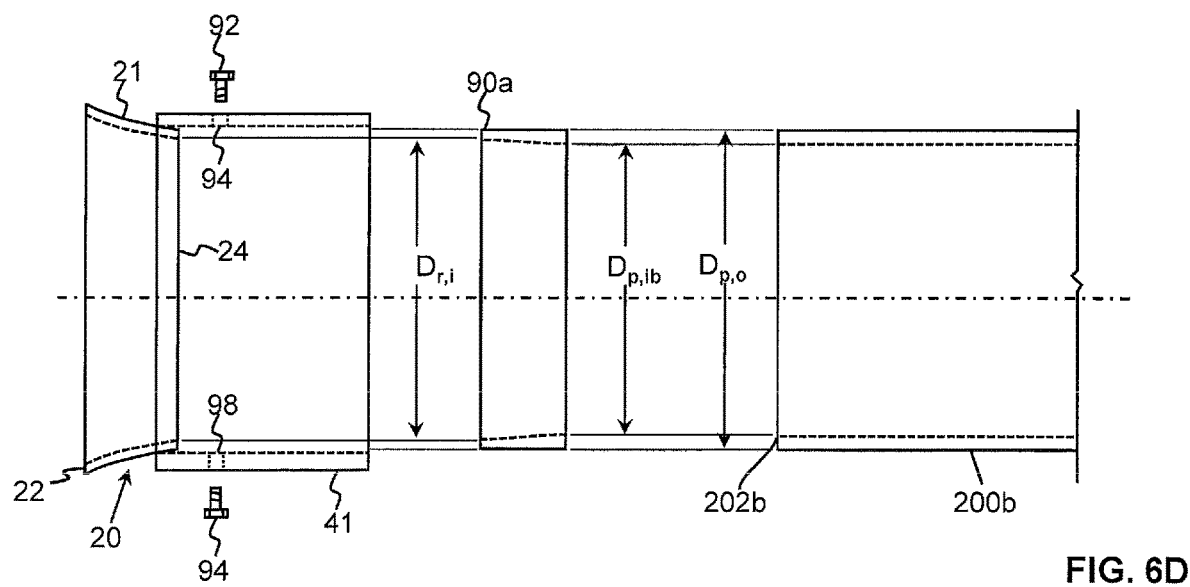

FIGS. 6C and 6D show the assembled view and the exploded view, respectively, of the subassembly, with first tubular reducer extension (90a), for use with the second pipeline (200b). In this embodiment, the inner diameter of the first tubular reducer extension (90a) at its rear end (the left end in FIG. 6D) is about 12.438 inches (315.926 mm)—that is about the same as the inner diameter, $D_{r,i}$, of the reducer (20) at its front end (24). In this embodiment, the inner diameter of the first tubular reducer extension (90a) at its front end (the right end in FIG. 6D) is about 11.376 inches (288.950 mm)—i.e., the same as the inner diameter, $D_{p,ib}$, of the second pipeline (200b). Accordingly, when the rear end of the first tubular reducer extension (90a) abuts against the front end (24) of the reducer (20), and when the end of the pipeline (200b) abuts against the front end of the first tubular reducer extension (90a) (as shown in FIG. 6C), their inner walls collectively create a smooth passage for the pig (100). When the first tubular reducer extension (90a) is used in this manner, the front end (24) of reducer (20) bears axially, indirectly, against the pipeline end (202b).

Figure 6E:
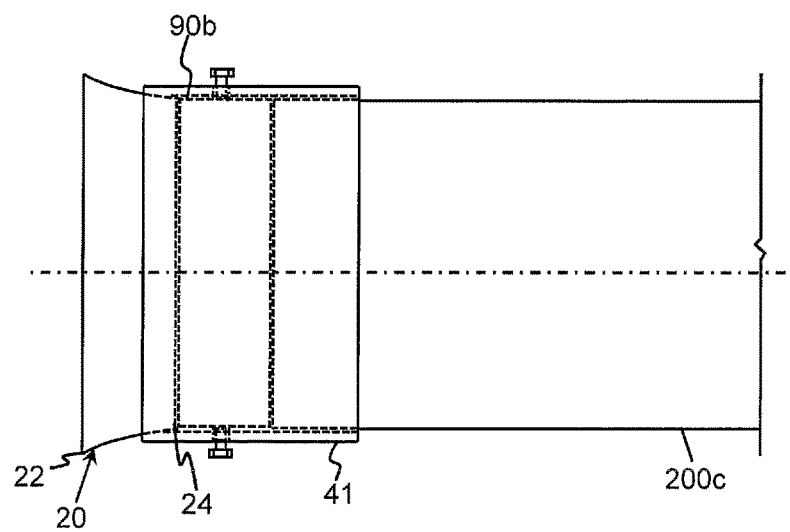
FIGS. 6E and 6F show an assembled view and an exploded view, respectively, of the subassembly of FIGS. 6A and 6B, with a second tubular reducer extension, in relation to a third pipeline having an inner diameter less than the inner diameter of the first pipeline in FIGS. 6A and 6B, and the second pipeline in FIGS. 6C and 6D.
Figure 6F:
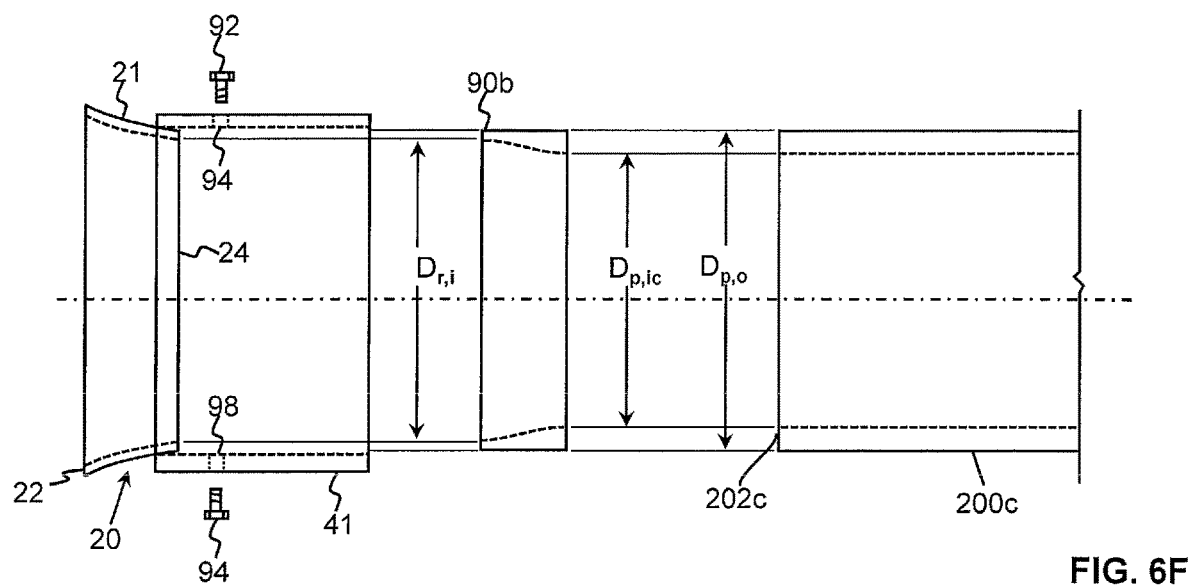

FIGS. 6E and 6F show the assembled view and the exploded view, respectively, of the subassembly, with second tubular reducer extension (90a), for use with the third pipeline (200c). In this embodiment, the inner diameter of the second tubular reducer extension (90b) at its rear end (the left end in FIG. 6F) is about 12.438 inches (315.926 mm)—i.e., the same as the inner diameter, $D_{r,i}$, of the reducer (20) at its front end (24). In this embodiment, the inner diameter of the second tubular reducer extension (90b) at its front end (the right end in FIG. 6F) is about 10.126 inches (257.200 mm)—i.e., the same as the inner diameter, $D_{p,ic}$, of the third pipeline (200c). Accordingly, when the rear end of the second tubular reducer extension (90b) abuts against the front end (24) of the reducer (20), and when the end of the pipeline (200c) abuts against the front end of the second tubular reducer extension (90b) (as shown in FIG. 6E), their inner walls collectively create a smooth passage for the pig (100). When the second tubular reducer extension (90b) is used in this manner, the front end (24) of reducer (20) bears axially, indirectly, against the pipeline end (202c).

As shown in FIGS. 6D to 6F, the position of the first or second tubular reducer extension (90a or 90b) within the tubular sleeve (41) may be secured with bolts or screws (92, 94) that pass through threaded apertures (96, 98) formed in the tubular sleeve (41). The bolts or screws (92, 94) engage the first or second tubular reducer extension (90a or 90b) with sufficient compression to prevent the first or second tubular reducer extension (90a or 90b) from falling out of the tubular sleeve (41) when the apparatus (10) is being mounted on the end of the pipeline (200b or 200c).

Although FIGS. 6A to 6F illustrate only two tubular reducer extensions (90a, 90b), the apparatus (10) may include a kit of any number of tubular reducer extensions having different inner diameters at their front end corresponding to different inner diameters of pipelines for which the apparatus (10) is intended to be used.

Definitions and Interpretation. References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. An apparatus for loading a pig into a pipeline defining an axial forward direction from a pipeline end defining a pipeline opening into a pipeline interior, a radial direction perpendicular to the axial direction, and a cylindrical outer wall extending axially forward from the pipeline end, the apparatus comprising:
    (a) a tubular reducer extending axially from a rear end to a front end configured for concentric alignment with and for bearing axially, either directly or indirectly, against the pipeline end, wherein an inner diameter of the reducer decreases from the rear end to the front end;
    (b) a pig-engaging surface and an attached rigid member, wherein the rigid member is configured for attachment to a first cable for pulling the rigid member axially forward relative to the reducer when the front end of the reducer bears axially, either directly or indirectly, against the pipeline end, whereupon the pig-engaging surface pushes the pig through the reducer and into the pipeline interior;
    (c) a guide member slidingly engaged by the rigid member to permit axial movement, while limiting radial movement, of the rigid member in relation to the reducer, when the first cable pulls the rigid member axially forward relative to the reducer; and
    (d) a support member for engaging the cylindrical outer wall of the pipeline to support the apparatus on the pipeline.

2. The apparatus of claim 1, wherein the pig-engaging surface is movably attached to the rigid member for selectively adjusting an axial position of the pig-engaging surface in relation to the reducer.

3. The apparatus of claim 1, wherein the pig-engaging surface is movably attached to the rigid member for selectively adjusting a radial position of the pig-engaging surface in relation to the reducer.

4. The apparatus of claim 1, wherein, the guide member is positioned adjacent to the pipeline in the radial direction when the front end of the reducer bears axially, either directly or indirectly, against the pipeline end.

5. The apparatus of claim 1, wherein the guide member comprises a tubular member that slidably receives the rigid member.

6. The apparatus of claim 1, wherein the guide member is attached to the reducer.

7. The apparatus of claim 6, wherein the guide member is permanently attached to the reducer.

8. The apparatus of claim 1, wherein the support member comprises a tubular sleeve that fits circumferentially around the cylindrical outer wall of the pipeline.

9. The apparatus of claim 8, further comprising a tubular reducer extension separable from the reducer, wherein the reducer extension extends axially from a rear end to a front end, wherein a rear end of the reducer extension is configured for concentric alignment with and for bearing axially, either directly or indirectly, against the front end of the reducer, wherein the front end of the reducer extension is configured for concentric alignment with and for bearing axially, either directly or indirectly, against the pipeline end, wherein an inner diameter of the reducer decreases from the rear end of the reducer extension to the front end of the reducer extension, wherein an inner diameter of the tubular reducer extension at the rear end of the reducer extension is substantially the same as the inner diameter of the reducer at the front end of the reducer, and wherein the reducer extension is disposed within the tubular sleeve of the support member.

10. The apparatus of claim 1, wherein the support member comprises an arcuate support that extends circumferentially around a portion of the cylindrical outer wall of the pipeline.

11. The apparatus of claim 1, further comprising the first cable, and a first winch for winding the first cable to increase tension in the first cable in the axially forward direction.

12. The apparatus of claim 11, further comprising a second cable for forming a sling circumferentially around the pipeline, wherein, the first winch is configured for attachment to the second cable such that, when the front end of the reducer bears axially, either directly or indirectly, against the pipeline end, winding the first cable with the first winch tightens the sling around the pipeline to transmit tension in the first cable to the pipeline.

13. The apparatus of claim 1, further comprising a flexible band or a third cable attached to the guide member and for constricting circumferentially around at least a portion of the pipeline to restrain movement of the guide member in relation to the pipeline.

14. The apparatus of claim 1, further comprising a second guide member that engages the rigid member to permit axial movement, while limiting radial movement of the rigid member in relation to the reducer, wherein, when the front end of the reducer bears axially, either directly or indirectly, against the pipeline end, the first guide member and the second guide member are disposed at different radial positions in relation to the pipeline.

15. The apparatus of claim 1, wherein the support member is rigidly attached to the reducer, and rigidly attached to the guide member.

16. The apparatus of claim 1, wherein the support member comprises a first tubular sleeve for engaging the cylindrical outer wall of the pipeline to support the apparatus on the pipeline, and a second tubular sleeve for engaging the cylindrical outer wall of the pipeline to support the apparatus on the pipeline, wherein the first tubular sleeve and the second tubular sleeve are axially spaced apart from each other, and wherein the first tubular sleeve and the second tubular sleeve are rigidly attached to the guide member.

17. A method for loading a pig into a pipeline defining an axial forward direction from a pipeline end defining a pipeline opening into a pipeline interior, and a radial direction perpendicular to the axial direction, the method comprising the steps of:
（a) providing an apparatus comprising:
  a tubular reducer extending axially from a rear end to a front end, wherein an inner diameter of the reducer decreases from the rear end to the front end;
  (ii) a rigid member attached to a first cable;
  (iii) a pig-engaging surface attached to the rigid member;
  (iv) a guide member slidingly engaged by the rigid member to permit axial movement, while limiting radial movement, of the rigid member in relation to the reducer, when the first cable pulls the rigid member axially forward relative to the reducer;
(b) aligning the reducer concentrically with the pipeline end, with the front end of the reducer bearing axially, either directly or indirectly, against the pipeline end;
(c) positioning the rigid member such that the pig-engaging surface is disposed axially rearward of the reducer, with the pig disposed axially between the pig-engaging surface and the reducer; and
(d) increasing tension in the first cable to pull the rigid member axially forward relative to the reducer while the front end of the reducer bears axially, either directly or indirectly, against the pipeline end, and while the pig-engaging surface engages the pig, wherein the rigid member being pulled axially forward by the tension in the first cable causes the pig-engaging surface attached to the rigid member to push the pig through the reducer and into the pipeline interior.

18. The method of claim 17, wherein the pig-engaging surface is movably attached to the rigid member for selectively adjusting an axial position of the pig-engaging surface in relation to the reducer.

19. The method of claim 17, wherein the pig-engaging surface is movably attached to the rigid member for selectively adjusting a radial position of the pig-engaging surface in relation to the reducer.

20. The method of claim 17, wherein the pipeline defines a cylindrical outer wall extending axially forward from the pipeline end, and wherein the apparatus further comprises a support member that engages the cylindrical outer wall of the pipeline to support the apparatus on the pipeline.

21. The method of claim 20, wherein the support member is rigidly attached to the reducer, and rigidly attached to the guide member.

22. The method of claim 20, wherein the support member comprises a first tubular sleeve for engaging the cylindrical outer wall of the pipeline to support the apparatus on the pipeline, and a second tubular sleeve for engaging the cylindrical outer wall of the pipeline to support the apparatus on the pipeline, wherein the first tubular sleeve and the second tubular sleeve are axially spaced apart from each other, and wherein the first tubular sleeve and the second tubular sleeve are rigidly attached to the guide member.

23. The method of claim 17, wherein, when the front end of the reducer bears axially, either directly or indirectly, against the pipeline end, the guide member is positioned adjacent to the pipeline in the radial direction.

24. The method of claim 17, wherein the apparatus further comprises a flexible band or a cable that is attached to the guide member and constricts circumferentially around at least a portion of the pipeline to restrain movement of the guide member in relation to the pipeline.

* * * * *